United States Patent
Lassl et al.

(10) Patent No.: US 10,557,710 B2
(45) Date of Patent: Feb. 11, 2020

(54) DUAL-AXIS ULTRA-ROBUST ROTATION RATE SENSOR FOR AUTOMOTIVE APPLICATIONS

(71) Applicant: Robert Bosch GmbH, Stuttgart (DE)

(72) Inventors: Andreas Lassl, Ditzingen (DE); Benjamin Schmidt, Stuttgart (DE); Burkhard Kuhlmann, Reutlingen (DE); Mirko Hattass, Stuttgart (DE); Thorsten Balslink, Kirchentellinsfurt (DE); Christian Hoeppner, Stuttgart (DE)

(73) Assignee: Robert Bosch GMBH, Stuttgart (DE)

( * ) Notice: Subject to any disclaimer, the term of this patent is extended or adjusted under 35 U.S.C. 154(b) by 165 days.

(21) Appl. No.: 15/751,364

(22) PCT Filed: Jun. 27, 2016

(86) PCT No.: PCT/EP2016/064826
§ 371 (c)(1),
(2) Date: Feb. 8, 2018

(87) PCT Pub. No.: WO2017/036627
PCT Pub. Date: Mar. 9, 2017

(65) Prior Publication Data
US 2018/0231381 A1    Aug. 16, 2018

(30) Foreign Application Priority Data
Aug. 28, 2015    (DE) .................. 10 2015 216 460

(51) Int. Cl.
G01C 19/5642    (2012.01)
G01C 19/5747    (2012.01)
G01C 19/574     (2012.01)

(52) U.S. Cl.
CPC ..... *G01C 19/5642* (2013.01); *G01C 19/5747* (2013.01); *G01C 19/574* (2013.01)

(58) Field of Classification Search
CPC ................. G01C 19/5642; G01C 19/5747
(Continued)

(56) References Cited

U.S. PATENT DOCUMENTS

2012/0125099 A1    5/2012    Scheben et al.
2012/0210788 A1    8/2012    Gunther et al.

FOREIGN PATENT DOCUMENTS

DE    102010061755 A1    5/2012
DE    102011006394 A1    10/2012
JP    2012519267 A      8/2012

OTHER PUBLICATIONS

International Search Report dated Sep. 15, 2016, of the corresponding International Application PCT/EP2016/064826 filed Jun. 27, 2016.

*Primary Examiner* — Justin Seo
*Assistant Examiner* — Rodney T Frank
(74) *Attorney, Agent, or Firm* — Norton Rose Fulbright US LLP; Gerard Messina (57) ABSTRACT

A rotation rate sensor including a substrate having a main plane of extension, a first rotation rate sensor structure for detecting a first rotation rate about an axis that is in parallel to a first axis extending in parallel to the main plane of extension, and a second rotation rate sensor structure for detecting a second rotation rate about an axis that is parallel to a second axis extending perpendicularly with respect to the main plane of extension. Also included is drive device for deflecting a first structure of the first rotation rate sensor structure, and a second structure of the first rotation rate sensor structure, and also for deflecting a third structure of the second rotation rate sensor structure, and a fourth structure of the second rotation rate sensor structure, in such (Continued)

a way that the first, second, third, and fourth structures are excitable into a mechanically coupled oscillation.

10 Claims, 4 Drawing Sheets

(58) Field of Classification Search
USPC .................................................. 73/504.02
See application file for complete search history.

DUAL-AXIS ULTRA-ROBUST ROTATION RATE SENSOR FOR AUTOMOTIVE APPLICATIONS

BACKGROUND INFORMATION

For safety-relevant applications in the automotive field, single-axis rotation rate sensors are used which may measure a rotation rate about a defined axis in each case. Combining various applications (electronic stability program (ESP) or rollover sensing, for example) requires the simultaneous measurement of the rotation rate about various axes, which at the present time is typically achieved by using multiple individual sensors.

A rotation rate sensor is described in U.S. Patent Application Pub. No. US2012/0210788 A1, for example.

SUMMARY

An example rotation rate sensor according to the present invention may have the advantage over the related art that a rotation rate sensor that is robust against linear and rotational accelerations is provided on a substrate surface that is small compared to the related art. The micromechanical structure for detecting rotation rates requires only a small substrate surface compared to the related art.

This is achieved in that, in contrast to the related art, the first structure and the fourth structure are excitable into an essentially linear oscillation in phase with respect to one another, and are excitable into an essentially linear oscillation in phase opposition with respect to the second structure and the third structure, in each case with motion components essentially in parallel to a third axis extending perpendicularly with respect to the first axis and perpendicularly with respect to the second axis, the rotation rate sensor being configured in such a way that a first action of force on the first structure and a second action of force on the second structure, essentially in phase opposition with respect to the first action of force, are detectable based on the first rotation rate, and a third action of force on the third structure and a fourth action of force on the fourth structure, essentially in phase opposition with respect to the third action of force, are detectable based on the second rotation rate.

In particular a dual-axis rotation rate sensor that is robust against linear and rotational acceleration is thus provided in a simple, cost-effective, and mechanically robust manner. This is achieved in particular in that two rotation rate sensor cores are combined and jointly driven. For example, with the aid of the present invention it is possible to combine a sensor core for the Z rotation rate and a sensor core for the X rotation rate to form a new sensor core which includes only one drive circuit and which may measure the rotation rate about two axes. At the same time, the sensor is robust against external linear and rotational accelerations, and thus meets the requirements for safety-relevant applications in the automotive field. Due to the combination of two jointly driven sensor cores, it is possible to save on components in the sensor core and also in the application-specific integrated circuit (ASIC). The end product is thus more compact and less expensive to manufacture than two single sensors. The joint drive allows savings on drive structures as well as electrical connection pads. In addition, the joint drive allows a more compact design of the ASIC since only one drive control loop must be provided. In particular, the advantage of the joint drive lies in the avoidance of two different drive frequencies of the two cores. Mutual influencing, for example by parasitic crosstalk of the drive forces, is thus avoided. In single cores, in each case the Coriolis mass, which must be able to move in the drive direction and detection direction, is connected via a suitable coupling structure to the drive structure, which is to oscillate only in the drive direction. In the present invention, the Coriolis masses of the various channels are directly coupled. It is thus possible, for example, to provide a rotation rate sensor in which internal Coriolis masses are driven by external Coriolis masses. The drive structures hereby engage only with the external Coriolis masses.

Advantageous embodiments and refinements of the present invention are described herein with reference to the drawings.

According to one preferred refinement, it is provided that the first rotation rate sensor structure includes at least one fifth structure that is movable with respect to the substrate and with respect to the first and second structures, and at least one sixth structure that is movable with respect to the substrate and with respect to the first, second, and fifth structures, the fifth and sixth structures being excitable into the mechanically coupled oscillation, the fifth structure being excitable into an essentially linear oscillation in phase with respect to the second and third structures, and being excitable into an essentially linear oscillation in phase opposition with respect to the first, fourth, and sixth structures, with a motion component that is essentially in parallel to the third axis, the rotation rate sensor being configured in such a way that a fifth action of force on the fifth structure and a sixth action of force on the sixth structure, essentially in phase opposition with respect to the fifth action of force, are detectable based on the first rotation rate. This advantageously makes it possible for the first rotation rate to be detectable in a compact, simple manner that is robust in particular against linear and rotational accelerations. In particular, a rotation rate sensor for detecting two rotation rates about two mutually perpendicular rotation axes with small space requirements compared to the related art is thus possible. In addition, combining an X rotation rate sensor which includes four masses and is robust against linear and rotational accelerations and a Z rotation rate sensor which includes two masses and is robust against linear and rotational accelerations is thus made possible.

According to one preferred refinement of the present invention, it is provided that the second rotation rate sensor structure includes at least one seventh structure that is movable with respect to the substrate and with respect to the third and fourth structures, and at least one eighth structure that is movable with respect to the substrate and with respect to the third, fourth, and seventh structures, the seventh and eighth structures being excitable into the mechanically coupled oscillation, the seventh structure being excitable into an essentially linear oscillation in phase with respect to the first and fourth and/or sixth structure(s), and being excitable into an essentially linear oscillation in phase opposition with respect to the second, third, eighth, and/or fifth structure(s), with a motion component essentially in parallel to the third axis, the rotation rate sensor being configured in such a way that a seventh action of force on the seventh structure and an eighth action of force on the eighth structure, essentially in phase opposition with respect to the seventh action of force, are detectable based on the second rotation rate. This advantageously makes it possible for the second rotation rate to be detectable in a compact, simple manner that is robust in particular against linear and rotational accelerations. In particular, this makes it possible for the upwardly moved and the downwardly moved masses to be identical. In particular, it is thus made possible that the sum of the masses of the structures oscillating in phase essentially corresponds to the sum of the masses of the structures oscillating in phase opposition. It is thus ensured via symmetry that the amplitudes of the partial oscillators in the drive movement are all equal, and also cannot vary due to process variation. In particular, a symmetrical arrangement is more robust against external accelerations, since the excitable modes are then also correspondingly symmetrical, and deliver no signal due to the differential evaluation.

According to one preferred refinement of the present invention, it is provided that the drive device includes at least one first drive unit and at least one second drive unit that is coupled to the first drive unit, and at least one third drive unit that is spatially separate from the first and second drive units, and at least one fourth drive unit that is coupled to the third drive unit, the first, second, third, and fourth drive units having essentially the same design. It is thus advantageously made possible that the mechanically coupled oscillation and in particular the essentially linear oscillation of the individual structures in phase and in phase opposition with respect to one another, in particular at a drive frequency, are assisted by mechanical coupling in the drive device.

According to one preferred refinement of the present invention, it is provided that the third structure includes a first substructure for detecting the third action of force, and the fourth structure includes a second substructure for detecting the fourth action of force, the first substructure and the second substructure having essentially the same design. The drive movement is thus advantageously mechanically separate from the detection movement for detecting the second rotation rate. This allows a particularly simple evaluation of the detection signal based on the second rotation rate.

According to one preferred refinement of the present invention, it is provided that the seventh structure includes a third substructure for detecting the seventh action of force, and the eighth structure includes a fourth substructure for detecting the eighth action of force, the third substructure and the fourth substructure having essentially the same design. The drive movement is thus advantageously mechanically separate from the detection movement for detecting the second rotation rate, and provides a rotation rate sensor that is robust against linear and rotational accelerations. For a rotation rate sensor that is robust against linear and rotational accelerations, this allows a particularly simple evaluation of the detection signal based on the second rotation rate. When the z detection combs are shortened by one-half in order to achieve the same detection capacity as in the asymmetrical case without seventh and eighth structures, the Coriolis frame and the detection frame are provided in duplicate.

According to one preferred refinement of the present invention, it is provided that the rotation rate sensor includes at least one first coupling means
  either for coupling the first, second, third, and fourth structures to the drive device and/or coupling the third structure to the fifth structure and/or coupling the fourth structure to the sixth structure,
  or for coupling the third, fourth, seventh, and eighth structures to the drive device and coupling the first structure to the seventh structure and coupling the second structure to the eighth structure, and/or coupling the third structure to the fifth structure and/or coupling the fourth structure to the sixth structure, the first coupling means being elastically deformable in a direction essentially in parallel to the first axis and in a direction essentially in parallel to the second axis, and being essentially dimensionally stable in a direction essentially in parallel to the third axis. For example, the first coupling means between the Coriolis masses of the X and Z channels is designed in such a way that forces in the drive direction, i.e., forces acting in parallel to the Y axis, are well transmitted from one Coriolis mass to another Coriolis mass, and at the same time, for forces in the detection directions of the connected Coriolis masses, i.e., in parallel to forces acting on the X and Z axes, there is preferably little transmission of these forces from one Coriolis mass to another Coriolis mass, so that the Coriolis masses that are directly coupled together do not interfere with one another. A rotation rate sensor that includes a combination of two sensor cores with a shared drive is thus provided in a simple, mechanically robust, and cost-effective manner. In particular, it is thus made possible that a drive movement is transmitted from the outer structures, i.e., from the structures that interact directly with the drive device via the first coupling means, to the inner structures, i.e., to the structures that do not interact directly with the drive device via the first coupling means, and the outer and inner structures are thus excitable into the mechanically coupled oscillation.

According to one preferred refinement of the present invention, it is provided that the rotation rate sensor includes at least one second coupling means for coupling the first substructure to the second substructure and/or for coupling the third substructure to the fourth substructure, the second coupling means being designed in such a way that the first substructure and the second substructure are deflectable with respect to one another essentially only in phase opposition, and/or that the third substructure and the fourth substructure are deflectable with respect to one another essentially only in phase opposition. A rotation rate sensor for detecting the second rotation rate is thus advantageously provided which has increased robustness against linear and rotational accelerations.

According to one preferred refinement of the present invention, it is provided that the rotation rate sensor includes at least one third coupling means for coupling the first, second, fifth, and sixth structures, the third coupling means including a first coupling means structure and a second coupling means structure in such a way that the first coupling means structure and the second coupling means structure are pivotable, essentially in opposite directions, about an axis that extends essentially in parallel to the third axis. A rotation rate sensor for detecting the first rotation rate is thus advantageously provided which has increased robustness against linear and rotational accelerations. In particular, a coupling of the first, second, fifth, and sixth structures is thus made possible in such a way that the first, second, fifth, and sixth structures are excitable into the mechanically coupled oscillation, and at the same time are deflectable along the first, second, fifth, and sixth actions of force.

According to one preferred refinement of the present invention, it is provided that the rotation rate sensor includes at least one fourth coupling means for coupling the first structure to the fifth structure and for coupling the second structure to the sixth structure, the fourth coupling means being designed to be pivotable about an axis extending essentially in parallel to the first axis, the center of mass of the fourth coupling means being essentially fixed with respect to the substrate during the mechanically coupled oscillation. It is thus advantageously made possible that the fourth coupling means rests in the drive movement, and in the detection movement makes a tilting movement from a plane in parallel to the main plane of extension. In this way, the fourth coupling means may be used not only as a mechanical coupling structure, but at the same time, also as an electrode for the Coriolis detection or positive feedback. It is thus advantageously possible to achieve a compact sensor design.

DETAILED DESCRIPTION OF EXAMPLE EMBODIMENTS

Identical parts are provided with the same reference numerals in the various figures, and therefore are generally designated or mentioned only once in each case.

Figure 1:
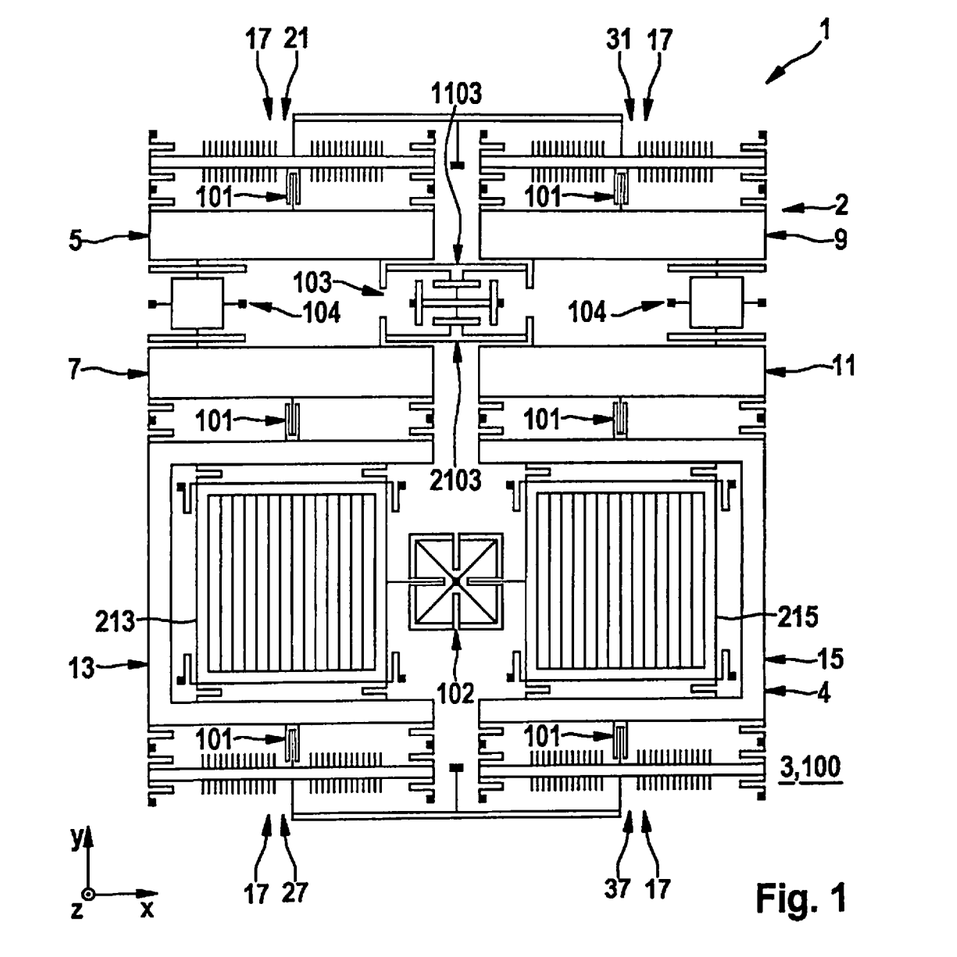
FIG. 1 shows a schematic illustration of a rotation rate sensor according to a first exemplary specific embodiment of the present invention.

FIG. 1 shows a schematic illustration of a rotation rate sensor 1 according to a first exemplary specific embodiment of the present invention, rotation rate sensor 1 including a substrate 3 having a main plane of extension 100, and a first rotation rate sensor structure 2 for detecting a first rotation rate of rotation rate sensor 1 about an axis essentially in parallel to a first axis X, and a second rotation rate sensor structure 4 for detecting a second rotation rate of rotation rate sensor 1 about an axis essentially in parallel to a second axis Z. In addition, rotation rate sensor 1 includes a drive device 17 for deflecting a first structure 5 that is movable with respect to substrate 3, and a second structure 9 that is movable with respect to substrate 3 and with respect to first structure 5, and a fifth structure 7 that is movable with respect to substrate 3 and with respect to first and second structures 5, 9, and a sixth structure 11 that is movable with respect to substrate 3 and with respect to first, second, and fifth structures 5, 9, 7 of first rotation rate sensor structure 2 in each case, and for deflecting a third structure 13 that is movable with respect to substrate 3, and a fourth structure 15 that is movable with respect to substrate 3 and with respect to third structure 13, of second rotation rate sensor structure 4 in each case, in such a way that first, second, third, fourth, fifth, and sixth structures 5, 9, 13, 15, 7, 11 are excitable into a mechanically coupled oscillation.

For example, first structure 5, fourth structure 15, and sixth structure 11 are excitable into an essentially linear oscillation in phase with respect to one another, and are excitable into an essentially linear oscillation in phase opposition with respect to second structure 9, third structure 13, and fifth structure 7, in each case with motion components essentially in parallel to a third axis Y. In addition, rotation rate sensor 1 is configured, for example, in such a way that a first action of force on first structure 5 and a second action of force on second structure 9, essentially in phase opposition with respect to the first action of force, as well as a fifth action of force on fifth structure 7 and a sixth action of force on sixth structure 11, essentially in phase opposition with respect to the fifth action of force, are detectable based on the first rotation rate. In addition, rotation rate sensor 1 is configured, for example, in such a way that a third action of force on third structure 13 and a fourth action of force on fourth structure 15, essentially in phase opposition with respect to the third action of force, are detectable based on the second rotation rate.

Figure 2:
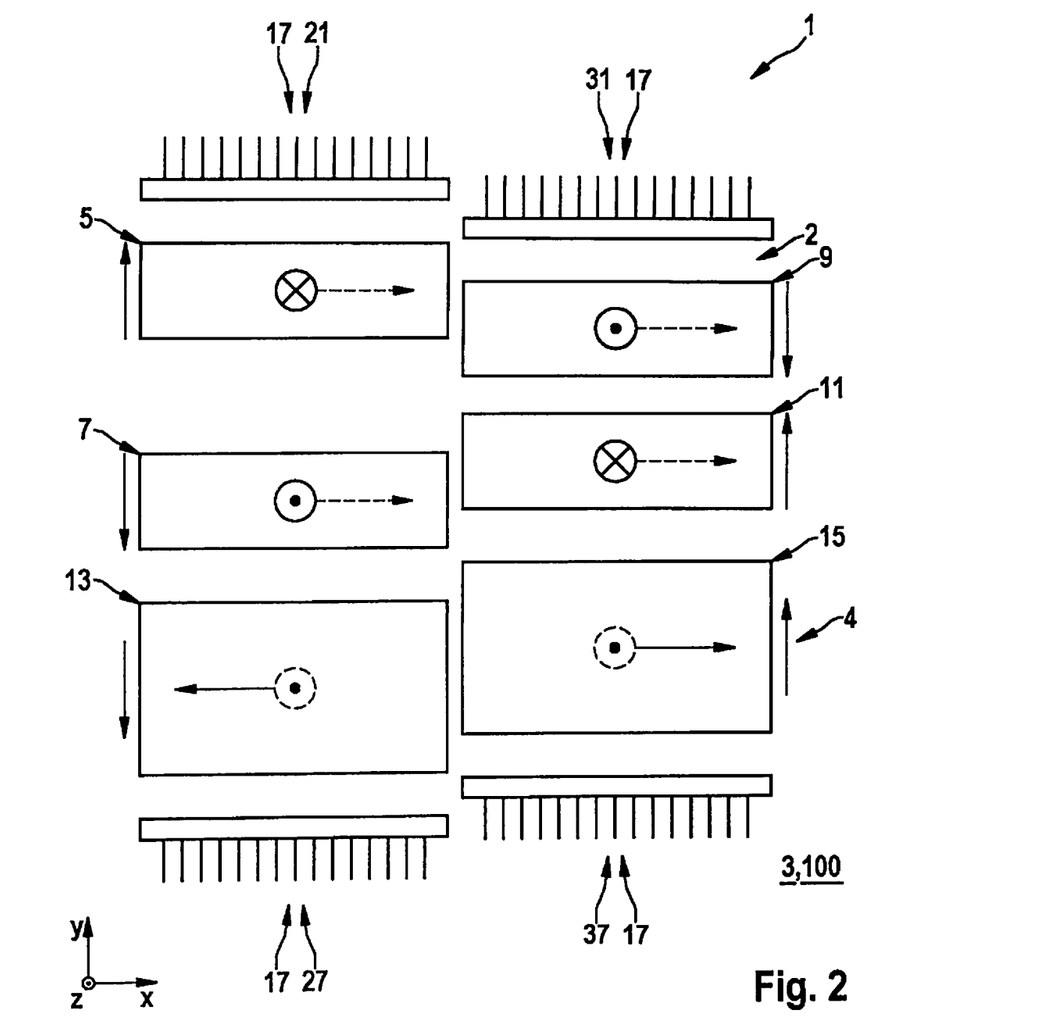
FIG. 2 shows a schematic illustration of the rotation rate sensor according to FIG. 1.

FIG. 2 shows a schematic illustration of rotation rate sensor 1 according to FIG. 1, a schematic type of movement of rotation rate sensor 1 being illustrated in FIG. 2. The arrows show a drive movement by way of example in addition to the masses, i.e., structures 5, 7, 9, 11, 13, and 15. In addition, the dashed-line arrows show the external rotation rate to be measured. In FIG. 2, this is the first rotation rate on structures 5, 7, 9, 11 and the second rotation rate on structures 13 and 15, by way of example. Furthermore, the solid arrows show the resulting actions of force on the masses which result, for example, deflections of the masses along the respective actions of force due to the applied first and second rotation rates.

Figure 3:
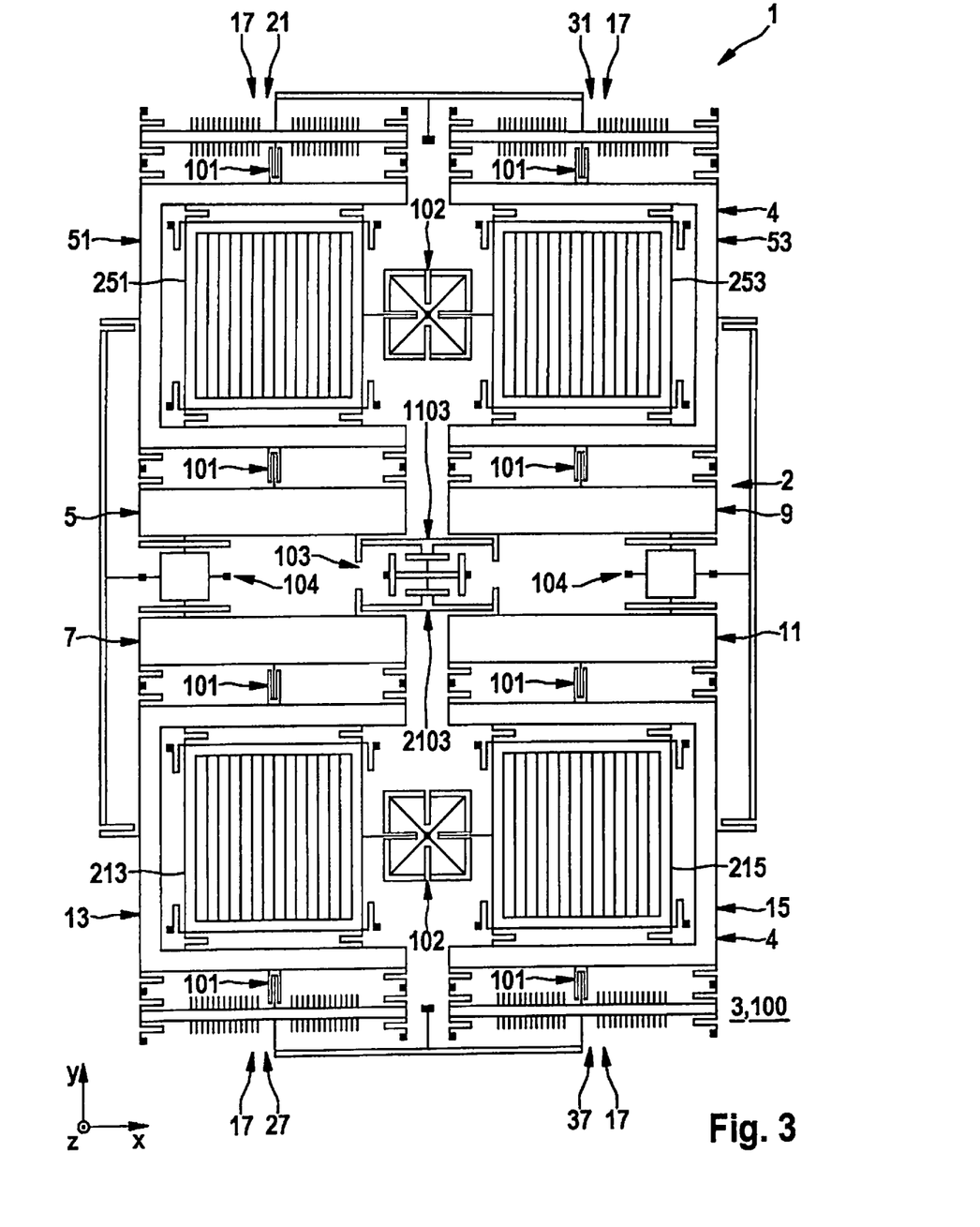
FIG. 3 shows a schematic illustration of a rotation rate sensor according to a second exemplary specific embodiment of the present invention.

FIG. 3 shows a schematic illustration of a rotation rate sensor 1 according to a second exemplary specific embodiment of the present invention, second rotation rate sensor structure 4 including a seventh structure 51 that is movable with respect to substrate 3 and with respect to third and fourth structures 13, 15, and an eighth structure 53 that is movable with respect to substrate 3 and with respect to third, fourth, and seventh structures 13, 15, 51, seventh and eighth structures 51, 53 being excitable into the mechanically coupled oscillation. Seventh structure 51 is excitable, for example, into an essentially linear oscillation in phase with respect to first, fourth, and sixth structures 5, 15, 11, and is excitable into an essentially linear oscillation in phase opposition with respect to second, third, eighth, and fifth structures 9, 13, 53, 7, with a motion component that is essentially in parallel to third axis Y. In addition, rotation rate sensor 1 is configured, for example, in such a way that a seventh action of force on seventh structure 51 and an eighth action of force on eighth structure 53, essentially in phase opposition with respect to the seventh action of force, are detectable based on the second rotation rate. The rotation rate sensor illustrated in FIG. 3 additionally includes, for example, two lateral rockers that couple third structure 13 to seventh structure 51, and fourth structure 15 to eighth structure 53. A joint Z detection frequency is thus advantageously obtained.

Figure 4:
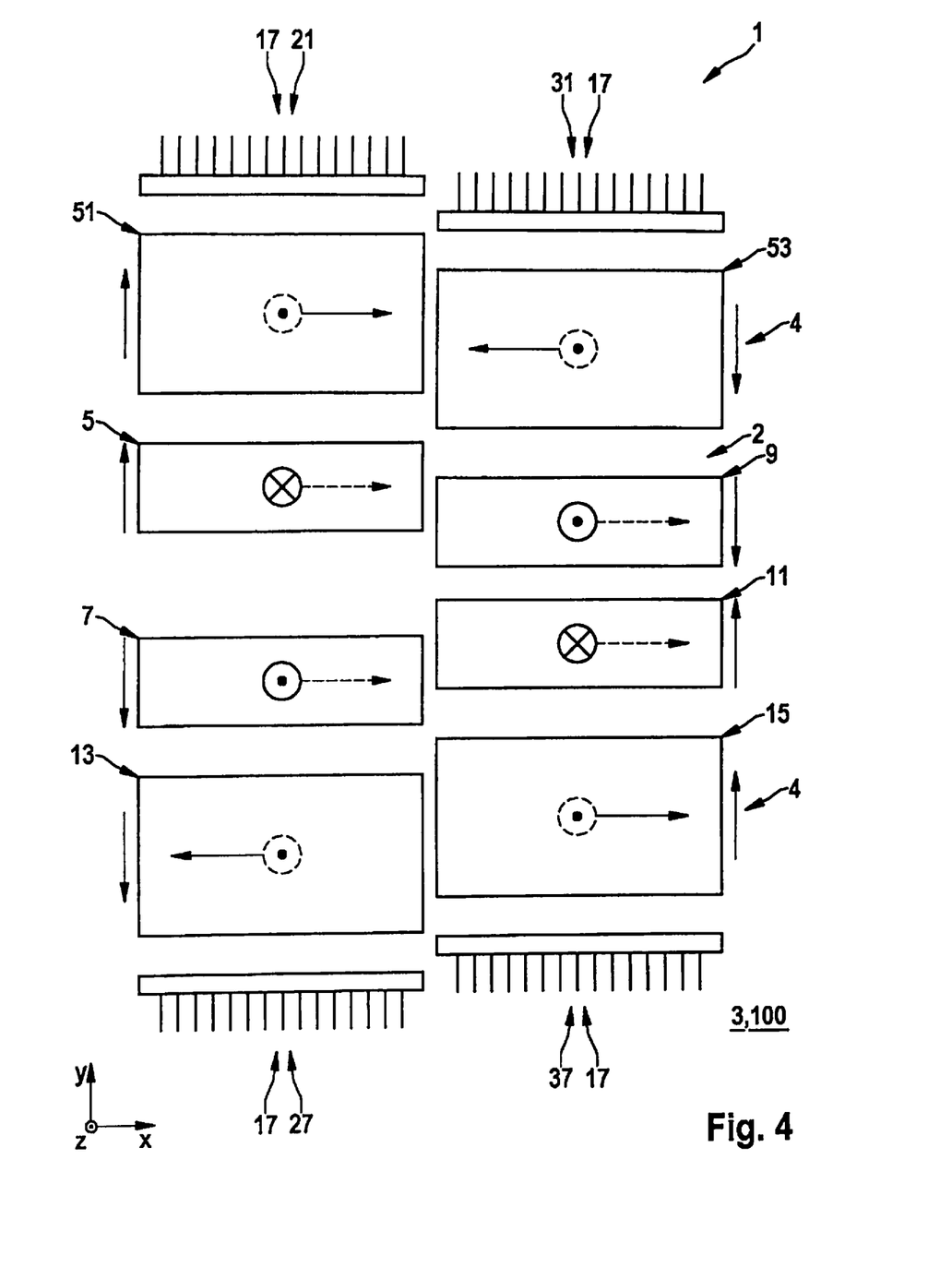
FIG. 4 shows a schematic illustration of the rotation rate sensor according to FIG. 3.

FIG. 4 shows a schematic illustration of rotation rate sensor 1 according to FIG. 3, a schematic type of movement of rotation rate sensor 1 being illustrated in FIG. 4. Similarly as in FIG. 2, the arrows indicate a drive movement by way of example in addition to the masses, the dashed-line arrows indicate the external rotation rates to be measured, and the solid arrows indicate the resultant actions of force on the masses.

In the exemplary embodiment illustrated in FIGS. 1 and 3, drive device 17 includes a first drive unit 21 and a second drive unit 31 that is coupled to first drive unit 21, and a third drive unit 27 that is spatially separate from first and second drive units 21, 31 and a fourth drive unit 37 that is coupled to third drive unit 27. In the exemplary embodiments illustrated in FIGS. 1 and 3, first, second, third, and fourth drive units 21, 31, 27, 37 have essentially the same design. For example, first drive unit 21 and second drive unit 31 as well as third drive unit 27 and fourth drive unit 37 are coupled with the aid of a drive rocker K4 from DE 10 2011 006 394 A1.

In addition, in the exemplary embodiment illustrated by way of example in FIGS. 1 and 3, third structure 13 includes a first substructure 213 for detecting the third action of force, and fourth structure 15 includes a second substructure 215 for detecting the fourth action of force, first substructure 213 and second substructure 215 having essentially the same design. In the exemplary embodiment illustrated by way of example in FIG. 3, seventh structure 51 includes a third substructure 251 for detecting the seventh action of force, and eighth structure 53 includes a fourth substructure 253 for detecting the eighth action of force, third substructure 251 and fourth substructure 253 having essentially the same design.

In addition, rotation rate sensor 1 illustrated in FIGS. 1 and 3 includes first coupling means 101, second coupling means 102, third coupling means 103, and fourth coupling means 104. For example, first coupling means 101 includes a coupling spring K1 that is soft in the X and Z directions and hard in drive direction Y, second coupling means 102 includes a coupling structure K2 for Z detection from DE 10 2011 006 394 A1, third coupling means 103 includes coupling structure K3 of the X channel from DE 10 2010 061 755 A1, and fourth coupling means 104 includes a coupling rocker K4 of the X channel from DE 10 2010 061 755 A1.

First coupling means 101 is provided
either as illustrated in FIG. 1, for coupling first, second, third, and fourth structures 5, 9, 13, 15 to drive device 17 and coupling third structure 13 to fifth structure 7 and fourth structure 4 to sixth structure 11,
or, as illustrated in FIG. 3, for coupling third, fourth, seventh, and eighth structures 13, 15, 51, 53 to drive device 17, coupling first structure 5 to seventh structure 51 and second structure 9 to eighth structure 53, and coupling third structure 13 to fifth structure 7 and fourth structure 15 to sixth structure 11. First coupling means 101 is elastically deformable or soft in a direction essentially in parallel to first axis X and in a direction essentially in parallel to second axis Z, and is essentially dimensionally stable or hard in a direction essentially in parallel to third axis Y.

In addition, second coupling means 102 is provided for coupling first substructure 213 to second substructure 215 (FIG. 1) and/or for coupling third substructure 251 to fourth substructure 253 (FIG. 3). Second coupling means 102 is designed in such a way that first substructure 213 and second substructure 215 are deflectable essentially only in phase opposition with respect to one another, and/or that third substructure 251 and fourth substructure 253 are deflectable essentially only in phase opposition with respect to one another.

In addition, third coupling means 103 is provided for coupling first, second, fifth, and sixth structures 5, 9, 7, 11. Third coupling means 103 includes a first coupling means structure 1103 and a second coupling means structure 2103, in such a way that first coupling means structure 1103 and second coupling means structure 2103 are pivotable, essentially in opposite directions, about an axis extending essentially in parallel to third axis Y.

Lastly, fourth coupling means 104 is provided for coupling first structure 5 to fifth structure 7 and for coupling second structure 9 to sixth structure 11. Fourth coupling means 104 has a design that is pivotable about an axis extending essentially in parallel to first axis X. In addition, the center of mass of fourth coupling means 104 is essentially fixed with respect to substrate 3 during the mechanically coupled oscillation.

What is claimed is:

1. A rotation rate sensor, comprising:
   a substrate having a main plane of extension;
   at least one first rotation rate sensor structure for detecting a first rotation rate of the rotation rate sensor about an axis that is essentially in parallel to a first axis extending in parallel to the main plane of extension;
   at least one second rotation rate sensor structure for detecting a second rotation rate of the rotation rate sensor about an axis that is parallel to a second axis extending perpendicularly with respect to the main plane of extension;
   a drive device for deflecting at least one first structure of the first rotation rate sensor structure that is movable with respect to the substrate, and at least one second structure of the first rotation rate sensor structure that is movable with respect to the substrate and with respect to the first structure, and for deflecting at least one third structure of the second rotation rate sensor structure that is movable with respect to the substrate and at least one fourth structure of the second rotation rate sensor structure that is movable with respect to the substrate and with respect to the third structure, in such a way that the first, second, third, and fourth structures are excitable into a mechanically coupled oscillation;
   wherein the first structure and the fourth structure are excitable into a linear oscillation in phase with respect to one another, and are excitable into an linear oscillation in phase opposition with respect to the second structure and the third structure, in each case with motion components in parallel to a third axis extending perpendicularly with respect to the first axis and perpendicularly with respect to the second axis, the rotation rate sensor being configured in such a way that a first action of force on the first structure and a second action of force on the second structure, in phase opposition with respect to the first action of force, are detectable based on the first rotation rate, and a third action of force on the third structure and a fourth action of force on the fourth structure, in phase opposition with respect to the third action of force, are detectable based on the second rotation rate.

2. The rotation rate sensor as recited in claim 1, wherein the first rotation rate sensor structure includes at least one fifth structure that is movable with respect to the substrate and with respect to the first and second structures, and at least one sixth structure that is movable with respect to the substrate and with respect to the first, second, and fifth structures, the fifth and sixth structures being excitable into the mechanically coupled oscillation, the fifth structure being excitable into a linear oscillation in phase with respect to the second and third structures, and being excitable into a linear oscillation in phase opposition with respect to the first, fourth, and sixth structures, with a motion component that is in parallel to the third axis, the rotation rate sensor being configured in such a way that a fifth action of force on the fifth structure and a sixth action of force on the sixth structure, in phase opposition with respect to the fifth action of force, are detectable based on the first rotation rate.

3. The rotation rate sensor as recited in claim 2, wherein the second rotation rate sensor structure includes at least one seventh structure that is movable with respect to the substrate and with respect to the third and fourth structures, and at least one eighth structure that is movable with respect to the substrate and with respect to the third, fourth, and seventh structures, the seventh and eighth structures being excitable into the mechanically coupled oscillation, the seventh structure being excitable into a linear oscillation in phase with respect to at least one of the first, fourth, and sixth structures, and being excitable into a linear oscillation in phase opposition with respect to at least one of the second, third, eighth, and fifth structures, with a motion component in parallel to the third axis, the rotation rate sensor being configured in such a way that a seventh action of force on the seventh structure and an eighth action of force on the eighth structure, in phase opposition with respect to the seventh action of force, are detectable based on the second rotation rate.

4. The rotation rate sensor as recited in claim 1, wherein the drive device includes at least one first drive unit and at least one second drive unit that is coupled to the first drive unit, and at least one third drive unit that is spatially separate from the first and second drive units, and at least one fourth drive unit that is coupled to the third drive unit, the first, second, third, and fourth drive units having the same design.

5. The rotation rate sensor as recited in claim 1, wherein the third structure includes a first substructure for detecting the third action of force, and the fourth structure includes a second substructure for detecting the fourth action of force, the first substructure and the second substructure having the same design.

6. The rotation rate sensor as recited in claim 3, wherein the seventh structure includes a third substructure for detecting the seventh action of force, and the eighth structure includes a fourth substructure for detecting the eighth action of force, the third substructure and the fourth substructure having the same design.

7. The rotation rate sensor as recited in claim 3, wherein:
the rotation rate sensor includes at least one first coupling device for at least one of: (i) coupling the first, second, third, and fourth structures to the drive device, (ii) coupling the third structure to the fifth structure, (iv) coupling the fourth structure to the sixth structure, (v) coupling the third, fourth, seventh, and eighth structures to the drive device and coupling the first structure to the seventh structure and coupling the second structure to the eighth structure, (vi) coupling the third structure to the fifth structure, (vii) coupling the fourth structure to the sixth structure; and
the first coupling device is elastically deformable in a direction in parallel to the first axis and in a direction in parallel to the second axis, and is dimensionally stable in a direction in parallel to the third axis.

8. The rotation rate sensor as recited in claim 7, wherein:
the rotation rate sensor includes at least one second coupling device for at least one of: (i) coupling the first substructure to the second substructure, and (ii) coupling the third substructure to the fourth substructure;
the second coupling device is designed in such a way that at least one of: (i) the first substructure and the second substructure are deflectable with respect to one another only in phase opposition, and (ii) the third substructure and the fourth substructure are deflectable with respect to one another only in phase opposition.

9. The rotation rate sensor as recited in claim 3, wherein the rotation rate sensor includes at least one third coupling device for coupling the first, second, fifth, and sixth structures, the third coupling device including a first coupling device structure and a second coupling device structure in such a way that the first coupling device structure and the second coupling device structure are pivotable, in opposite directions, about an axis that extends in parallel to the third axis.

10. The rotation rate sensor as recited in claim 3, wherein the rotation rate sensor includes at least one fourth coupling device for coupling the first structure to the fifth structure and for coupling the second structure to the sixth structure, the fourth coupling device being designed to be pivotable about an axis extending in parallel to the first axis, the center of mass of the fourth coupling device being fixed with respect to the substrate during the mechanically coupled oscillation.

\* \* \* \* \*